Patented Aug. 18, 1942

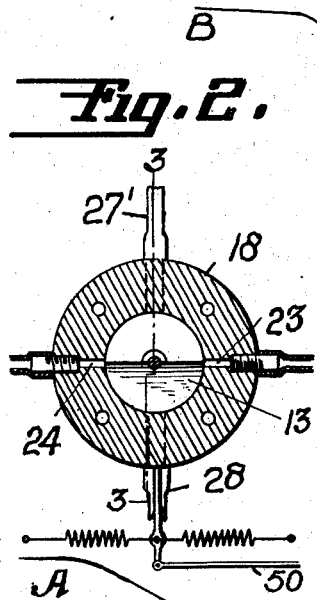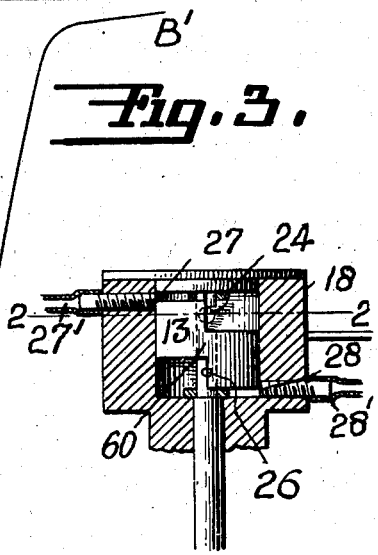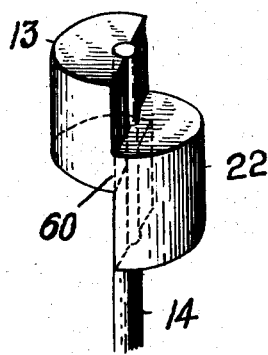

2,293,293

UNITED STATES PATENT OFFICE 2,293,293

AIR PICK-OFF FOR SENSITIVE INSTRUMENTS

William M. Harcum, Brooklyn, N. Y., assignor to Sperry Gyroscope Company, Inc., Brooklyn, N. Y., a corporation of New York Application June 1, 1938, Serial No. 211,307

7 Claims. (Cl. 121—41)

This invention relates to differential air flow pick-off devices for sensitive instruments in which it is important that no torque be exerted on the latter. My invention has special application to the vacuum or negative pressure type of pick-off wherein air is continuously exhausted from the enclosure containing the pick-off device or devices and differentially flows into the enclosure through opposite ports which are oppositely closed and opened upon relative displacement of the sensitive device and the follow-up device or fixed part of the craft. Such devices have become quite common in the art of automatic pilots for airplanes, for example, being shown in the prior patent to Sperry, Carlson and Bates No. 1,992,970 dated March 5, 1935. A more recent example is shown in the copending application of Theodore W. Kenyon and Stephen J. Zand, now Patent No. 2,210,916, for Automatic pilot for dirigible craft, dated August 13, 1940, and it is to this type of pilot that my invention is shown applied.

In the differential flow system it is necessary to provide leaks either at the relay or other control device, or in the line between the relay and the pick-off intake port. For instance, in the aforesaid prior patent of Kenyon and Zand, leaks are shown in the air chambers of the relay valve and also in the air chambers of the pick-off device. The purpose of such leaks is to create the necessary flow of air toward both pick-off ports so as to produce the differential pressure in the two lines when the ports are differentially opened and closed. Such leaks, however, are themselves the cause of an inherent inefficiency in the system, which may be appreciated by considering the conditions when one intake port is entirely closed and the other wide open. Under such conditions the pressure in the line connected to the closed port will be substantially atmospheric pressure, while the pressure on the line connected to the open port will never equal the pump negative pressure on account of the leak, but will always be above the pump pressure. This loss averages about 50% of the pump pressure, varying between 15 and 85%, depending upon the type of ports, passages and leaks.

From the foregoing analysis it will be evident that to attain as useful differential pressure all of the negative pressure produced by the pump, there should be no leak in the side of the line connected to the pump when the valve is wide open, and preferably that the leak should be reduced as the port is being opened.

One of the principal purposes of my invention is to overcome the foregoing deficiency in the present vacuum systems by providing a means for varying the amount of leak inversely with the amount of opening of the pick-off valve so that the leak is substantially entirely cut off when the pick-off valve is wide open. This is preferably done by employing an extra valve reversely moved with respect to the normal pick-off valve and which closes a leak port as the corresponding pick-off port is opened and vice versa.

Referring to the drawings, showing several forms my invention may assume:

Fig. 2 shows a vertical transverse section of the rotary valve taken on line 2—2 of Fig. 3.

Fig. 3 is a horizontal section of the same taken at right angles to Fig. 1, and on line 3—3 of Fig. 2.

Fig. 4 is a perspective view of the double rotary valve proper or cut-off member.

Fig. 5 is a diagram showing the improved efficiency secured by my invention.

Figure 1:
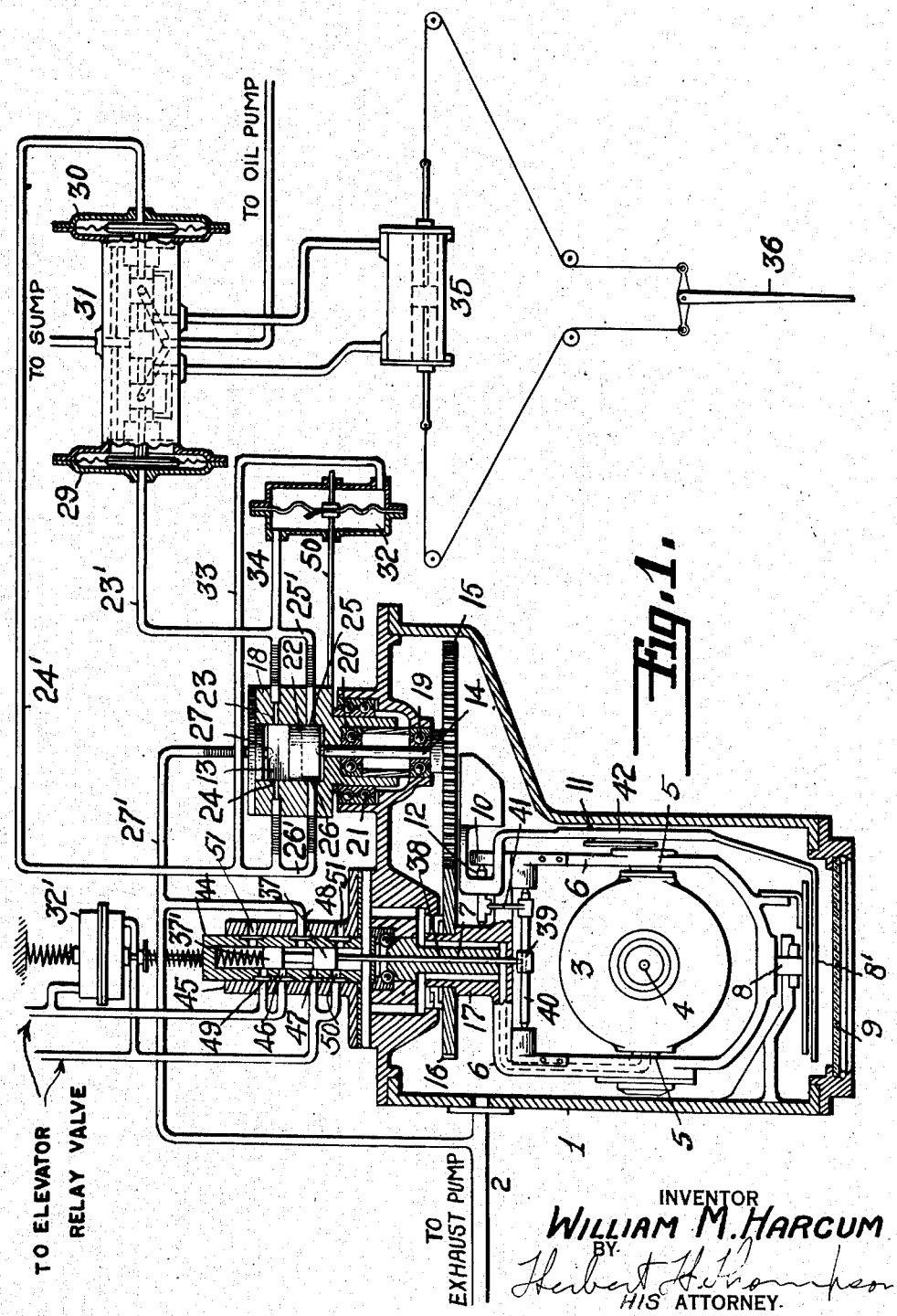
Fig. 1 shows my invention as applied to the gyro vertical of an automatic pilot, showing it applied both to the rotary type and piston type of pick-off valve, many of the parts being in horizontal section.

I have shown my invention as applied to a standard gyroscopic horizon or gyro vertical, enclosed within a casing 1, from which air is normally continuously pumped through a pipe 2. Said gyroscope is shown as in the form of a rotor bearing casing 3, carrying the rotor on a normally vertical spinning axis 4, the casing being trunnioned on transverse axis 5, 5 in gimbal ring 6, the gimbal ring being in turn trunnioned on fore and aft axis 7, 8 in casing 1. The horizon indicator of such a gyroscope is usually in the form of a horizontal bar 8' visible through the front window 9 and mounted on rearwardly extending lever 42 pivoted at 12 between extension 10 on ring 6 and hub 17, as more completely described in the prior patent to B. G. Carlson No. 1,982,636, dated December 4, 1934, for Air driven gyro verticals. Said bar is moved up and down on pitching of the craft by a crank pin 11 on trunnion 5 on the rotor casing, extending through the gimbal ring, while the said bar, being pivoted by a pin 12 on the gimbal ring, rocks laterally therewith on roll or bank of the craft.

The banking pick-off valve is shown as in the form of a semicircular cut off member or segment 13 or half cylinder mounted on a shaft 14 journaled at the rear and outside of the casing 1 in bearings 19 and 20, and which is turned from the gyroscope by means of a gear 15 on shaft 14 meshing with a gear 16 secured to the hub or extension 17 from the gimbal ring 6. Said segment 13 is enclosed in a housing or valve casing 18 which is also rotatably mounted about the axis of shaft 14, as by means of bearing 19 and 21.

I preferably incorporate in the same casing 18 my new cut-off valve 22 for the leaks or bleed holes. The inner valve structure therefore assumes the appearance shown in Fig. 4, consisting of two adjoining half cylinders, one cooperating with the opposed pick-off ports 23, 24 in the far end of the casing 18, and the other cooperating with the opposed leak ports 25 and 26 in the near end of the casing. The far end of the casing is at all times connected to the vacuum pump through port 27 and pipe 27', while the other part of this chamber is at all times connected to the atmosphere through the leak port 28 and, if desired, pipe 28', the chamber being separated into two parts by the central circular portion 60 of the rotary valve. The main pick-off ports 23 and 24 lead through pipes 23' and 24' to some form of differential pressure servo device. In their normal position, the ports 24 and 23 are both bisected by the main portion of the valve so that the pressure in the connected pipes 23' and 24' is equal. The same is true of the leak ports 25 and 26. In case, however, the valve is slightly rotated, say clockwise in Fig. 2, the opening of port 23 is increased while that of port 24 is decreased, thus immediately causing the presure in pipe 24' to rise and that in pipe 23' to fall, which action is increased by the corresponding and simultaneous increase in the opening of port 26 and decrease in the opening of port 25.

From an inspection of Figs. 1, 2 and 3 it will be seen that each primary port 23 and 24 is connected in series with a bleed port 25, 26, respectively, through the pipe connections 25', 26', thereby furnishing two parallel paths for the air flow between the continuously open intake port 28 and the continuously open outflow port 27. Each of said passages is tapped by the pipes 23' and 24', transmitting the static pressure in the respective passages to the valve chambers 29 and 30, respectively. No appreciable air flow occurs, therefore, through the valve chambers 29 and 30, but the pressure in each follows closely the static pressure of the air flowing through the passages 25' and 26', respectively, which in turn depends on the relative opening of the two pairs of ports in series 23, 25 and 24, 26. In order to build up the effective pressure, the servo device includes a relay valve 31, having opposite air pressure chambers 29 and 30. The bleeds therefor are provided in said pipes 23' and 24' by the pipes 25', 26' tapped into pipes 23', 24', respectively, and connected to the leak ports 25, 26. The follow-back pressure device 32 also has its two sides connected to the pipes 23', 24' and the connected leak pipes through pipes 33, 34, so that the leak ports 25, 26 serve both the main relay valve 31 and the follow-back chamber 32.

The device 32 operates as a follow-back to cut off the primary impulse by rotating the valve casing 18 through valve stem 50 to follow the valve 13, as more fully explained in the aforesaid patent of Kenyon and Zand.

A consideration of my new valve will show that as one of the main pick-off ports is opened and the other is closed, the leak to the first port is being closed and the leak to the second port is being opened, so that maximum efficiency is secured at all times, the leak connected to the opening port being entirely closed at the time said port is wide open. The rate of change of pressure $dp/dt$ (sensitivity) is also materially increased. It will be understood that the main servo motor 35 is operated preferably hydraulically from the relay valve 31, the former controlling the control surface or surfaces 36, in this instance the ailerons.

My invention is likewise applicable to the piston type of pick-off device shown operating about the fore and aft axis of the plane in Fig. 1. According to this form, a double piston valve 37, 37' is connected through a piston rod 38 to a rocker arm 39 secured to a shaft 40 pivoted on the gimbal ring 6, said shaft being rocked from an arm 41 rocked from the movement of the lever 42 carrying the horizon bar 8', the arrangement being shown more in detail in the aforesaid patent of Kenyon and Zand. Surrounding the double piston 37, 37' is a sleeve 44 which is adjustable from the follow-back chamber 32' similar to device 32. Said sleeve is provided not only with the main pick-off ports 46 and 47 and with the main pump port 48, but also with bleed ports 49 and 50 located on opposite sides of the pistons 37 and 37' from the main ports 46, 47. Hence, it will be seen that as one of the main ports is closed, the corresponding bleed will be opened, and vice versa. I have also shown exhaust ports 51 connected with the atmosphere. It will be understood that the several ports in sleeve 44 extend through the same and are enlarged at their outer ends so as to remain under the proper ports in the housing 45 regardless of the slight movement of the sleeve under the follow-back influence of the chamber 32'.

The improved efficiency secured by my invention is graphically shown in Fig. 5 wherein the abscissas are plotted in both directions from zero and represent degree of displacement of the pick-off valve member 13, while the ordinates represent percentage of effective differential pressure (i. e. the applied vacuum) from zero to 100. The curves A and A' show a typical example of efficiency for the ordinary type pick-off valve, while curves B and B' show the efficiency for my improved type of valve with the cut-off for the bleed openings as well as the pick-off openings.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a rotary pick-off valve of the differential air flow type for sensitive elements, an outer enclosing member having pick-off ports and bleed ports adjacent opposite ends thereof, means for continuously withdrawing air from the end thereof containing the pick-off ports, a leak to the atmosphere continuously connected to the other end thereof, an inner relatively movable double acting cut-off member separating said two ends and normally acting to partially and equally close all said ports, one of which members is connected to the sensitive element to be turned thereby, a differential pressure servo device connected with each pick-off port, the aforesaid bleed ports being respectively connected between the proper pick-off port and said device, and said pick-off member upon initial displacement in one direction operating to increase the opening of one pick-off port and decrease the opening of the other pick-off port and to simultaneously decrease the opening of the bleed port connected to the first pick-off port and to increase the opening of the bleed port connected to the second pick-off port.

2. In a pick-off valve of the differential air flow type for sensitive elements, a double semi-cylindrical rotary valve turned from said element, a ported chamber therefor having a pair of pick-off ports and a continuously open pump port in one end and a pair of bleed ports and a continuously open port connected to the atmosphere in the other end, said valve separating the two ends of said chamber, and pipes connecting a servo device to said pick-off ports, said bleed ports being connected in said pipes, so constructed and arranged that as one pick-off port is being opened and the other closed, the bleed port connected to the former is being closed and the other bleed port is being opened.

3. In a pick-off rotary valve of the differential air flow type for sensitive elements, an outer enclosing member having pick-off ports, means for maintaining said member at a pressure different from atmospheric pressure, an inner relatively turnable cut-off member, one of which members is connected to the sensitive element to be turned thereby, a differential pressure follow-back device connected with each port and also coupled with the other of said members to turn the same, a differential pressure servo device connected with each port, leaks between each port and said devices to supply air flow, and additional valve means operated from said element for cutting off either leak as said cut-off member opens the corresponding port.

4. In a differential air flow rotary valve for sensitive elements, a casing having a cylindrical chamber therein, a relatively rotary valve therewithin spaced at both ends from the ends of said chamber, said valve comprising a central cylindrical portion dividing the chamber into two parts, a partial cylinder having a cut-off surface on one side of said central portion, a second partial cylinder having an oppositely facing cut-off surface on the other side of said central portion, a pair of ports in said casing adjacent the two edges of each of said surfaces so as to be normally partially open an equal amount, whereby as one port is being opened the other port is being closed, and a port at each end of said casing beyond said valve, one of which is adapted to be connected to an air pump and the other to the atmosphere.

5. In a differential air flow rotary valve for sensitive elements, a casing having a cylindrical chamber therein, a relatively rotary valve therewithin spaced at both ends from the ends of said chamber and dividing the chamber into two parts, said valve having one end formed as a segmental cylinder with its plane surface facing in one direction, and the other end similarly formed but with its plane surface facing in a different direction, a pair of ports in said casing adjacent the two edges of each of said surfaces so as to be normally partially open an equal amount, whereby as one port is being opened the other port is being closed, and a port adjacent each end of said casing, both of which remain open during the normal operation of the valve, and one of which remains connected to an air pump and the other to the atmosphere.

6. A rotary pick-off valve for a sensitive device such as a gyroscope, by means of which the said valve produces a differential air pressure to control a servo device, comprising a cylindrical valve chamber partitioned into two axially separated compartments, two channels connecting each of two circumferentially spaced ports in the wall of one of said compartments to respective circumferentially spaced ports in the wall of the other compartment, a rotary valve member within said chamber operated by said sensitive device normally positioned so that each of said ports is partially opened to the same extent and adapted, when rotated in one direction, to gradually close a port at one end of one of said channels and to simultaneously further open a port at the other end of said channel, and at the same time to further open a port at one end of the other channel and to simultaneously further close a port at the end of said channel throughout substantial rotational movements of said valve, a pair of pipes connected to said two channels adapted to transmit the static pressure therein to the servo device, and an additional port in each of said compartments which remains open during all normal positions of said valve and which ports are connected to sources of different air pressure, whereby a variable flow of air is maintained from one compartment to the other through both said channels, the difference in pressure therein being dependent upon the angular position of the valve member, thereby transmitting said pressure differences through said pipes to the servo device.

7. A rotary pick-off valve of the differential air pressure type for controlling a servo device from a sensitive device such as a gyroscope, comprising a cylindrical chamber having two pairs of ports in the walls thereof spaced axially of the cylinder, the ports of each pair being spaced circumferentially from each other, channels connecting one port of each pair with a corresponding port of the other pair, thereby providing two parallel paths for air flow, means for maintaining one end of the cylinder at an air pressure superior to that of the other, causing continuous flow through one or both of said channels, a valve member inside said chamber and rotatable with respect thereto and adapted to gradually simultaneously close the high pressure port and open the low pressure port of one channel and simultaneously to gradually open the high pressure port and to close the low pressure port of the other channel through substantial angular movements of the valve, an air pressure responsive servo device, and means for transmitting thereto the differential static air pressure existing in said two chambers.

WILLIAM M. HARCUM.